Jan. 13, 1970  A. N. GREENWOOD ET AL  3,489,951
CIRCUIT INTERRUPTING MEANS FOR A HIGH VOLTAGE D-C CIRCUIT
Original Filed Oct. 5, 1967  3 Sheets-Sheet 2

Fig.2.

INVENTORS:
ALLAN N. GREENWOOD,
THOMAS H. LEE,
BY William Freedman
ATTORNEY

INVENTORS:
ALLAN N. GREENWOOD,
THOMAS H. LEE,

BY William Freedman
ATTORNEY

United States Patent Office 3,489,951
Patented Jan. 13, 1970

3,489,951
CIRCUIT INTERRUPTING MEANS FOR A HIGH VOLTAGE D-C CIRCUIT
Allan N. Greenwood, Media, and Thomas H. Lee, Nether Providence, Pa., assignors to General Electric Company, a corporation of New York
Continuation of application Ser. No. 673,136, Oct. 5, 1967. This application Apr. 2, 1969, Ser. No. 817,237
Int. Cl. H02h 3/00, 7/00, 5/04
U.S. Cl. 317—11                                                                                           17 Claims

ABSTRACT OF THE DISCLOSURE

Means for interrupting a high voltage D-C circuit comprising means for discharging a capacitor through an interrupting device to create a current zero. For limiting the recovery voltage then developed across the interrupting device, a triggered vaccum gap device connected between the main D-C conductors at the source terminal of the interrupting device is triggered into conduction at a point near current zero. The resulting current through the gap device is commutated off by again discharging the aforesaid capacitor, this time through the triggered gap device.

This is a continuation of application Ser. No. 673,136, filed Oct. 5, 1967, now abandoned.

BACKGROUND

This invention relates to means for interrupting a high voltage direct-current circuit and relates more particularly to circuit interrupting means of the type in which a current zero is created by discharging a commutating capacitor through a circuit interrupting device.

In the particular circuit interrupting means that we are concerned with, a circuit interrupting unit, hereinafter referred to as an interrupter, is connected in series with a high voltage direct-current circuit that supplies current through the interrupter to a load. Connected across the interrupter is a normally-open commutating circuit that includes a precharged commutating capacitor. When the D-C circuit is to be opened, the capacitor is caused to discharge through the interrupter and the commutating circuit, thereby forcing the current through the interrupter to zero. The introduction of this current zero gives the interrupter an opportunity to build up dielectric strength and complete the interruption.

Whether the interrupter can complete interruption at this point depends upon whether it can successfully withstand the recovery voltage that builds up immediately following the point at which current zero is reached. The character of the recovery voltage is determined to a large extent by the values of capacitance, inductance, and ressitance then present in a circuit that extends between the terminals of the D-C source through the D-C line, the commutating capacitor, and any load remaining in the circuit. This circuit is an oscillatory circuit that includes the series combination of the system inductance and the commutating capacitor. Oscillation of entrained energy between this inductance and capacitor commences as soon as the current path through the interrupting unit is interrupted, as above described, and this oscillation constitutes an important component of the recovery voltage.

SUMMARY

An object of our invention is to reduce the peak value of the voltage developed by this oscillation so as to improve the interrupter's chance for successfully withstanding this voltage without breaking down.

One way of attaining this object is to increase the size of the commutating capacitor, but this approach is limited by economic considerations dictating that this capacitor be as small as possible.

Accordingly, anoher object of our invention is to limit the peak value of the voltage developed by this oscillation without increasing the effective size of the commutating capacitor.

We attain these objects in one embodiment of our invention by providing a surge suppressor on the source side of the circuit interrupter connected between the source terminal of the circuit interrupter and the return conductor to the source. This surge suppressor comprises a gap device which is caused to arc-over near the point at which current zero is reached and well before the recovery voltage builds up to an objectionably high value. After initial arc-over of this gap device, a follow current flows through the surge suppressor to permit the energy of the oscillation to be dissipated in the suppressor. To complete the interruption, this follow current must be terminated when the energy of the oscillation has been dissipated. We terminate this current by again relying upon an oscillatory commutating current to create a current zero in the total follow current through the gap device.

Another object of our invention is to derive this commutating current for the follow current from the same capacitor as is used for commutating the current through the main interrupter. Using the same capacitor for this added function obviates the need for an additional expensive capacitor.

Still another object is to interrupt the follow current without causing an overvoltage requiring additional surge suppression to protect the system.

Still another object is to utilize a portion of the above-described circuit interrupting arrangement for providing protection against lightning surges on the high voltage D-C circuit.

BRIEF DESCRIPTION OF DRAWINGS

For a better understanding of our invention, reference may be had to the following description taken in conjunction with the accompanying drawings, wherein:

FIG. 2 schematically illustrates the circuit interrupting arrangement of FIG. 1 during an interrupting operation.

DESCRIPTION OF A PREFERRED EMBODIMENT

Figure 1:
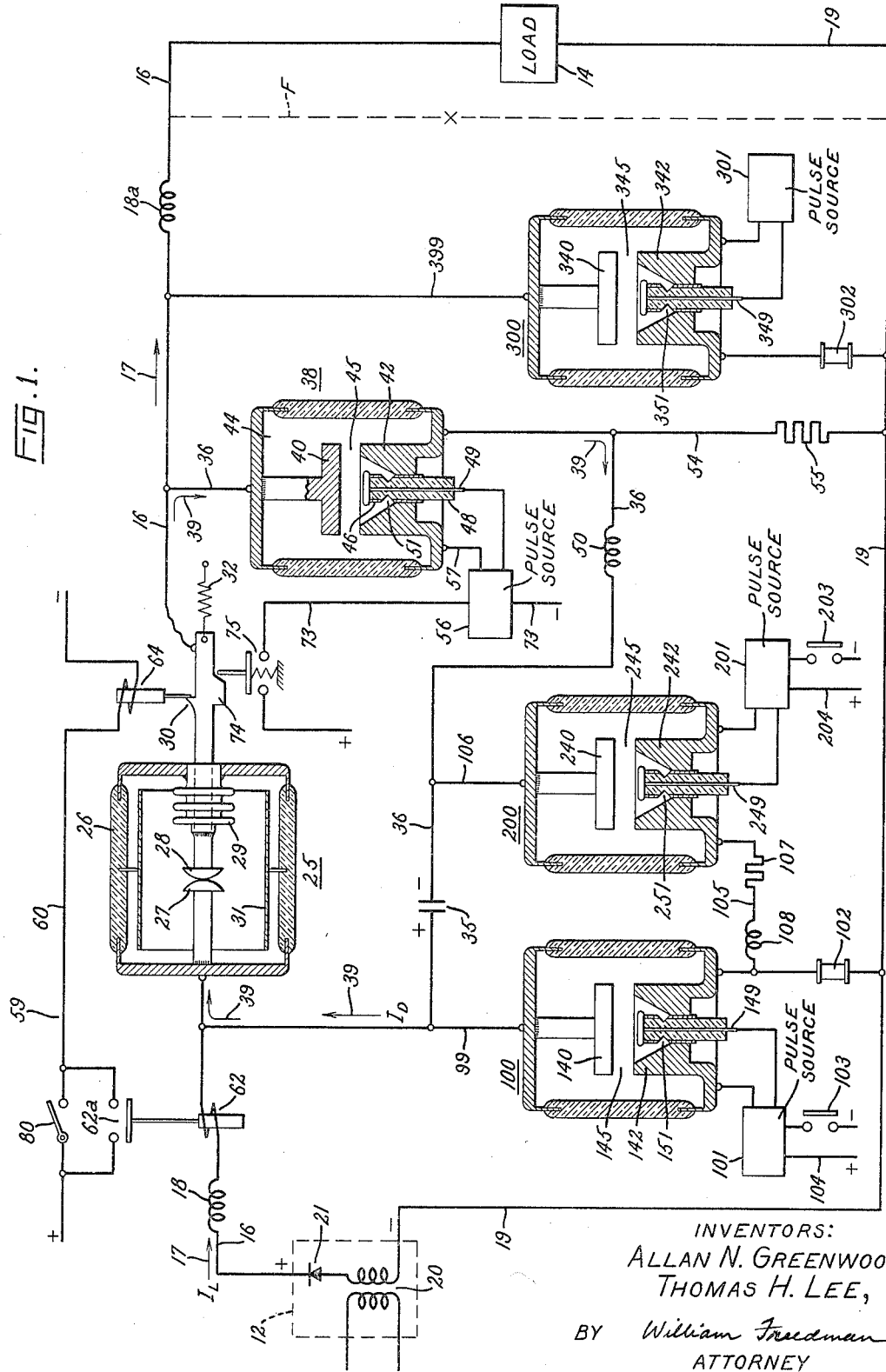
FIG. 1 is a schematic showing of a circuit interrupting arrangement embodying one form of my invention. The circuit interrupting arrangement is shown in its normally-closed position.

Referring now to FIG. 1, there is schematically shown a high voltage D-C circuit comprising a source 12, a load 14, and a power line 16 for delivering power to the load from the source. It will be assumed that the normal load current flows in the direction indicated by the arrows 17, returning to the source through a return conductor 19. The source 12 is schematically depicted as comprising a transformer 20 and a rectifier 21 connected in series with the secondary winding of the transformer.

For controlling the flow of current to the load 14, a circuit interrupter 25 is connected in the power line 16 in series with the load 14 between the source 12 and the load. The inductance of the power system on the source side of the interrupter is depicted at 18.

In a preferred embodiment of my invention, the circuit interrupter 25 is a vacuum-type circuit interrupter. As such, it comprises a highly evacuated envelope 26 partially of insulating material, and a pair of relatively-movable contacts 27 and 28 disposed within the evacuated envelope 26. The left-hand contact 27 is a stationary contact, and the right-hand contact 28 is a movable contact that projects through the right-hand end of the envelope 26. A suitable bellows 29 sealed at its respective opposite ends to the right-hand contact 28 and the envelope 26 permits the right-hand contact to move horizontally without impairing the vacuum inside the evacuated envelope 26.

The right-hand contact 28 is releasably held in its closed position of FIG. 1 by a suitable latch 30 and is biased to the right, or in an opening direction, by a suitable opening spring 32. When latch 30 is released, spring 32 drives movable contact 28 to the right to produce a gap 33 between the contacts, as shown in FIG. 2. This contact-separation establishes an arc 34 across the gap that is quickly extinguished and prevented from reigniting, thus interrupting the circuit, all in a manner soon to be explained in greater detail. For condensing the metallic vapors generated by the arc and for protecting the insulation of the envelope 26 from these vapors, a suitable metallic shield 31 of tubular configuration is provided inside the envelope.

The vacuum circuit interrupter 25 can be of a suitable conventional type and is therefore shown in schematic form only. Examples of vacum-type circuit interrupters suitable for this application are shown in more detail and are claimed in U.S. Patents 2,949,520—Schneider and 3,089,936—Smith, both assigned to the assignee of the present invention.

It is considerably more difficult to interrupt direct current than alternating current because direct current contains no naturally-occurring current zeros. With alternating currents, current zeros occur naturally; and to interrupt such currents, it is only necessary to prevent reignition of the arc after a natural current zero. But with direct current, it is necessary first to force the current to zero and then to prevent arc-reignition.

One way of forcing the current to zero is by forcing a locally-controlled current through the interrupter in opposition to the load current flowing therethrough. This is the general approach used in the illustrated interrupting arrangement, where the opposing current is derived from a commutating capacitor 35. As will soon be explained in more detail, this capacitor 35 is precharged with the polarity shown in FIG. 1. The capacitor 35 is located in a commutating or arc-quenching circuit 36 that is connected across the contacts 27, 28 of the interrupter 25. The commutating or arc-quenching circuit 36 is normally maintained in an open condition by normally-open circuit-making means 38 connected in series with the commutating capacitor 35. When the circuit-making means 38 is closed, as will soon be explained, commutating capacitor 35 discharges through a loop circuit that comprises the series combination of the contacts 27, 28 of the interrupter 25 and the arc quenching circuit 36. The capacitor discharge current $I_D$ initially flows through loop circuit 27, 28, 36 in the direction illustrated by arrows 39.

Figure 3:
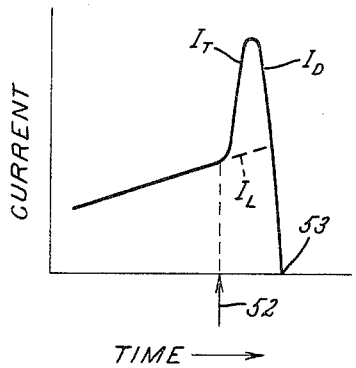
FIG. 3 is a graphical representation of the current flowing through the interrupting arrangement during an interrupting operation.

This loop circuit 27, 28, 36 is an oscillatory circuit, the capacitance of which is constituted primarily by capacitor 35 and the inductance of which can be represented by an inductance 50. The discharge current is a relatively high frequency oscillatory current that is superimposed on the current $I_L$ flowing through the power line 16. This relationship is illustrated in FIG. 3, where the total current flowing through the interrupter is illustrated by the curve $I_T$. When the capacitor initially discharges, beginning at an instant 52, the discharge current $I_D$ rapidly builds up to a positive peak and then oscillates toward a negative peak. This oscillation toward the negative peak results in capacitor discharge current being forced through the interrupter 25 in opposition to the current $I_L$, thereby driving the total current $I_T$ to zero at an instant 53 in FIG. 3.

In a preferred form of the invention, circuit interruption is effected by first separating the contacts 27 and 28 to draw an arc therebetween, as shown in FIG. 2. At a predetermined instant thereafter, the circuit-making means 38 is effectively closed to complete the commutating circuit 36, as shown in FIG. 2. This forces the oscillatory discharge current $I_D$ through the commutating circuit 36 and the interrupter 25, thus forcing the total current to zero, as illustrated in FIG. 3 and described hereinabove. When this total current is forced to zero, the arc between the contacts is extinguished.

Interruption is successfully completed if the gap 33 that is then present between the contacts 27, 28 can successfully withstand the recovery voltage that is quickly build up across the gap when the current zero point is reached. The illustrated interrupter, being a vacuum interrupter, can build up dielectric strength across the gap at an extremely rapid rate when the arc is extinguished at current zero, and this helps it to successfully withstand the recovery voltage transient. Further assistance is provided by limiting the peak to which this recovery voltage rises, as will soon be explained in greater detail.

The normally-open circuit-making means 38 is preferably a triggered vacuum gap of the general type shown and claimed in U.S. Patent 3,087,092—Lafferty or in application S.N. 580,998—Lafferty, filed Sept. 21, 1966, both assigned to the assignee of the present invention. The gap of Patent 3,087,092 comprises a pair of spaced-apart main electrodes 40 and 42 disposed in a highly evacuated chamber 44 and defining a main gap 45 therebetween. Disposed adjacent one main electrode 42 is a trigger electrode 46 defined by a hydrogen-impregnated titanium film on a ceramic supporting rod 48. This ceramic supporting rod 48 is disposed coaxially of the main electrode 42 and is suitably sealed to the main electrode 42 about its outer periphery. A portion of the ceramic supporting rod 48 is uncoated and defines a trigger gap 51 along this uncoated surface that electrically isolates the trigger electrode 46 from the main electrode 42 under normal conditions. A conductive connection 49 extends through the ceramic rod 48 and across its upper end surface to the trigger electrode 46.

When an electric pulse is applied between the trigger electrode 46 and the main electrode 42, the trigger gap 51 breaks down, and the resultant spark liberates a small quantity of hydrogen from the hydrogen-impregnated trigger electrode 46. This hydrogen is quickly ionized and projected into the main gap 45, thus lowering its dielectric strength and initiating a breakdown of the main gap. The arc established between electrodes 40, 42 upon breakdown of main gap 45 is illustrated at 47 in FIG. 2. When the main gap 45 thus breaks down, the commutating capacitor 35 can discharge through the commutating circuit 36 via arc 47 in the manner described hereinabove to force the current through the main interrupting device 25 to zero.

When the current in the commutating circuit 36 finally reaches zero, as will soon be explained, a high dielectric strength is automatically established across the main gap 45 of gap device 38, and the gap device is thus restored to its original normally-open condition.

The above-described pulse across the trigger gap is derived from any suitable conventional pulse source such as schematically shown at 56 connected in a pulse circuit 49, 51 that extends between the trigger electrode and the main electrode. This pulse source 56 is rendered operative in response to the movable contact 28 of the interrupter 25 reaching a predetermining point in its opening stroke. At this predetermined point, a cam 74 on the movable contact 28 closes a normally-open switch 75, thereby completing a turn-on circuit 73 in the pulse source 56, thus causing the trigger pulse to be applied to the trigger gap 51 and close the circuit-making means 38. FIG. 2 illustrates the position of the parts after the switch 75 has been closed to cause a pulse from source 56 to initiate breakdown of the gap device 38.

For charging the commutating capacitor 35, we rely upon the charging means disclosed and claimed in application S.N. 533,366, Greenwood, filed Mar. 10, 1966, and assigned to the assignee of the present invention. In this charging means, the commutating capacitor 35 is charged directly from the power lines 16, 19 without relying upon a separate charging source. In this regard, the commutating capacitor is connected to the power line 16 at the source side of the interrupter 25, and a charging circuit 54 is connected between the juncture of capacitor 35 and the circuit-making means 38 and the return conductor 19 of the power circuit. Capacitor 35 is always connected to the source side of the D.C. circuit, even when the circuit-making means 38 is open.

The charging circuit 54 comprises a resistance 55 of a relatively high value. Irrespective of whether the interrupter 25 is closed or open, the charging circuit 54 connects the series combination of the commutating capacitor 35 and the resistor 55 across the terminals of the source 12. As a result of this connection, the source 12 can charge the capacitor 35 to full line voltage with a charge of the polarity shown whether the interrupter 25 is open or closed (assuming the circuit-making means 38 is opened).

Since the commutating capacitor 35 is charged from the source 12 when the interrupter 25 is open, it is possible to close the interrupter 25 with assurance that the interrupter can immediately open to interrupt the circuit should this be necessary, say, as a result of a fault being present.

The resistor 55 should be of a relatively high value in order to prevent the commutating capacitor 35 from discharging too quickly should a fault, such as depicted at F in FIG. 1, develop between lines 16 and 19 at a point close to the interrupting device 25. In this respect, a fault of such a character, assumed to be located downstream from the interrupting arrangement, would connect the resistor 55 across the capacitor terminals and cause the capacitor 35 to begin discharging through resistor 55. If the discharging capacitor 35 lost an excessive portion of its initial charge prior to closing of circuit-making device 38, it would be ineffective to provide the desired commutating current when the circuit-making means 38 was closed. The resistance 55 is therefore made high enough to prevent any such excessive loss of charge on capacitor 35.

For initiating an opening operation, a conventional control circuit 59 shown in simplified schematic form is provided. Referring to FIG. 1, the control circuit 59 comprises a conductor 60 extending from the positive to the negative terminals of a control-voltage source through the normally-open contacts 62a of an overcurrent-responsive relay 62 and the coil of a tripping solenoid 64, which controls the latch 30. When the current in power line 16 exceeds a predetermined value, relay 62 picks up, closing its contacts 62a to complete an energizing circuit for solenoid 64. The solenoid responds by tripping latch 30 to cause opening of interrupter 25.

This opening operation can be initiated at will, instead of in response to an overcurrent, simply by manually closing a switch 80 in parallel with the normally-open contacts of the over-current-responsive relay 62. This completes the trip circuits 59 to initiate an opening operation in the same manner as above-described.

Although I prefer to use a vacuum interrupter for the main interrupting element (25) of my D-C interrupting arrangement, it is to be understood that my invention in its broader aspects comprehends the use of other types of switching devices, such as silicon controlled rectifiers.

When the current through arc 34 in the interrupter 25 has been driven to zero by discharging the commutating capacitor 35 therethrough, a recovery voltage builds up across the gap 33, as has already been pointed out. A major component of this recovery voltage results from the energy stored in inductance 18 charging capacitor 35 as soon as current through the interrupter is driven to zero. In many practical circuit applications, the amount of this energy can be extremely high, and, in the absence of our invention, the voltage developed by this charging action could rise to an extremely high level. But we limit the peak voltage that will be developed by this charging action by providing an energy-dissipating or suppressor circuit 99 that comprises the series combination of a normally-open gap device 100 and a non-linear resistor 102 connected between the source terminal of the interrupter and the return conductor 19. This gap device 100 is caused to arc-over near the point at which current zero is reached, preferably immediately after this point, and well before the voltage across the contacts rises to a value which might reignite the inter-contact gap. Arc-over of gap device 100 diverts current through the suppressor circuit 99 via non-linear resistor 102, thereby dissipating the energy of the oscillation in the non-linear resistor.

The gap device 100 is preferably a triggered vacuum gap of substantially the same design as the triggered vacuum gap 38, previously described. The parts of gap device 100 which correspond to similar parts of the gap device 38 have therefore been assigned the same reference numerals except with the number 1 ahead of each. The gap device 100 is triggered into conduction by a pulse supplied from a pulse source 101 when an input circuit 104 is completed by suitably controlled switching means 103.

The non-linear resistor 102 is preferably made of a material having a negative resistance-current characteristic, such as the material sold by General Electric Company under the trademark "Thyrite." When the current therethrough is high following initial breakdown of the gap device 100, the resistance of element 102 is low, and high values of current can pass therethrough without developing an excessive voltage thereacross. As dissipation of the surge energy nears completion, the resistance of element 102 builds up rapidly to limit the follow current through the suppressor circuit 99 to a much lower value, e.g., one-tenth of the initial current through the power line. The non-linear resistor 102 is selected so as to limit follow current as much as possible without producing an excessive voltage thereacross during the initial discharge of surge energy.

The gap device 100, being a vacuum device, cannot interrupt the current through suppressor circuit 99 until it is forced to zero. For forcing this current to zero, we supply to the gap device 100 a commutating current that is derived from the same capacitor 35 as was utilized for commutating the current through main interrupter 25. This capacitor 35 is in a charged condition at this instant since it was charged by the recovery voltage transient, as was previously described.

For initiating this commutating current, a third triggered vacuum gap device 200 is connected in series with the capacitor 35 across the second gap device 100. This gap 200 is normally non-conductive but can be rendered conductive by supplying to its trigger gap 251 a pulse derived from a pulse source 201. Pulse source 201 supplies the turn-on pulse when an input circuit 204 is completed by suitably controlled switching means 203. The details of the control for switching means 203 are not a part of our invention and are therefore not shown. In one form, this control may comprise a simple delay circuit (not shown) that closes switch 203 typically 10 milliseconds after gap 100 is fired. When this third gap device 200 is caused to arc-over, a discharge circuit for the commutating capacitor is completed therethrough via conductors 105 and 106. The inductance of this circuit is depicted at 108. This discharge current is an oscillatory current similar to the current $I_D$ depicted in FIG. 3. It therefore forces the total current through the gap device 100 to zero in a similar manner.

A recovery voltage builds up across the gap device 100 following the instant that the current is forced to zero, but the peak voltage developed by this particular recovery voltage is relatively low and can be easily withstood by gap device 100. The reason for this peak voltage being relatively low is that the current interrupted by the gap device 100 is low in view of the current-limiting action imposed by non-linear resistor element 102 during the period immediately preceding commutation of gap device 100. Since the energy stored in inductance 18 is directly proportional to the square of this current, only a moderate amount of stored energy needs to be dissipated and this can be handled by commutating capacitor 35 without developing an excessive voltage.

Consistent with effecting the desired interruption of current through gap device 100 but with the intent of minimizing the subsequent voltage transient, we include a resistor 107 in the commutating circuit 105, 106. This resistor 107 prevents the commutating current through this circuit from being unnecessarily high. A much lower commutating current than $I_D$ is permissible in view of the much lower current requiring interruption in gap device 100 as compared to that through interrupter 25.

It will be aparent from the above description that we use only a single commutating capacitor 35 from commutating the current through the main interrupter 25 and through surge suppressor circuit 99. Using the same capacitor for both these functions is a significant economic advantage since it enables us to eliminate one of the two expensive capacitors that would otherwise be needed.

The suppressing circuit 99 operates in the above-described manner whether the circuit breaker is operated at will or in response to a fault. Operation in response to a fault, however, imposes a more severe duty on the circuit breaker since the higher current resulting from the fault results in a much higher amount of energy in inductance 18 which must be dissipated by suppressor circuit 99.

In the above discussion we refer to dissipating the energy stored in the power circuit on the source side of the interrupter. There also can be energy stored in the power circuit on the load side of the interrupter which must be dissipated immediately following interruption. The inductance of the power circuit on the load side (schematically shown at 18a) discharges its energy through the fault path F, and in doing so, drives the voltage on the load terminal of the interrupter in a negative direction. For dissipating this energy, we provide a load-side surge suppressor circuit 399 that comprises the series combination of triggered vacuum gap device 300 and a non-linear resistance 302. This surge suppressor circuit 399 is connected between power line 16 and return conductor 19 at the load terminal of the interrupter 25.

The triggered vacuum gap device 300 corresponds in structure to the gap device 38, and the same reference numerals are used to designate corresponding parts of the two devices except that the number 3 appears before each designation applied to device 300. The non-linear resistor 302 has a negative resistance-current characteristic and corresponds to the resistor 102.

Shortly after current zero through the main interrupter and when the voltage across gap device 300 reaches a predetermined value, the gap device 300 is triggered into conduction by a suitably controlled pulse source 301 thereby completing the suppressor circuit 399. This permits the energy of the load side stored in inductance 18a to be dissipated through a closed loop that comprises the fault path F, a portion of return conductor 19, suppressor circuit 399, and a portion of power circuit 16. The gap device 300 requires no interrupting ability since there is no current source on the load side that would continue feeding current through the suppressor. The current on the load side simply decays to zero in a time proportional to the time constant $L/R$ of the above circuit, where L represents the inductance and R the resistance of this circuit. The negative coefficient resistance element 302 makes R relatively high and thus sharply reduces the decay time. When the current through the suppressor circuit reaches zero, the gap device 300 recovers its dielectric strength and returns to its original non-conducting, high dielectric strength condition.

The voltage appearing across the separated contacts of the main interrupter immediately following current zero is equal to the difference between (1) the voltage (between conductors 16 and 19) on the source side of the interrupter, and (2) the voltage (between conductors 16 and 19) on the load side, these two voltages being of opposite polarities. We limit this voltage to a relatively low value by producing sparkover of the gap devices 100 and 300 when the voltages thereacross are relatively low and by limiting the voltages developed across the non-linear resistors 102 and 302 to low values by appropriate selection of the resistors. In one embodiment of the invention, the non-linear resistors are so selected that the maximum voltage developed across resistor 102 is 1.6 per unit and the maximum voltage developed across resistor 302 is −0.8 per unit. As previously pointed out, the maximum voltage across the contacts is the difference between these voltages or, in this case, 2.4 per unit.

In a preferred form of our invention, the source side surge suppressing circuit 99 not only functions to limit the voltage developed across the separated contacts during the interrupting period but also serves as a lightning arrestor during other periods. This surge suppressing circuit 99 is capable of serving as a lightning arrestor because it has the ability to clear the usual follow current which flows after the initial breakdown by the lightning surge. In this respect, clearing of the follow current is effected by discharging the commutating capacitor 35 by sparking over gap device 200 in the auxiliary commutating circuit 105, 106. This causes the commutating capacitor 35 to discharge through the gap device 100 via auxiliary commutating circuit 105, 200, 106, thereby forcing the current through gap device 100 to zero and permitting it to clear.

The load side surge suppressor 399 is not capable of serving as a lightning arrestor since it has no self clearing ability. It is therefore important that no breakdown of this suppressor circuit 399 be produced by a lightning surge. To preclude the possibility of such a breakdown, the effective breakdown voltage of the load side gap device 300 is maintained well above that of the source side gap device 100. Hence, a lightning surge traveling down the line 60 will spark over the source side gap device 100 rather than the load side gap device 300. It is only during a circuit breaker operation that we depress the sparkover voltage of the load side surge suppressor 399, as was explained hereinabove.

Figure 4:
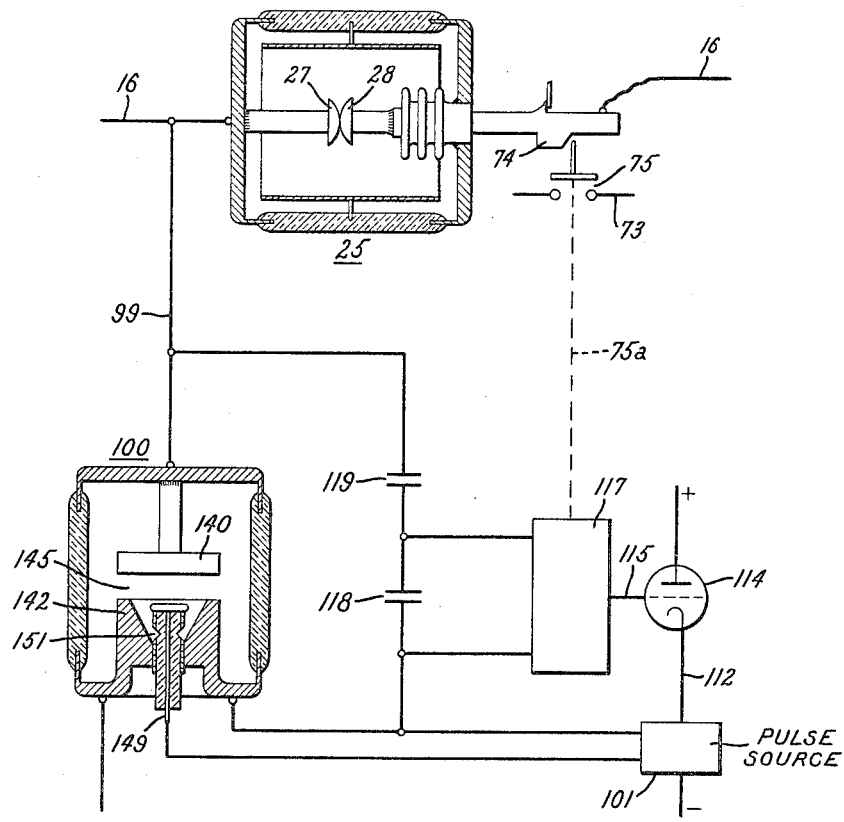
FIG. 4 is a schematic showing of a portion of the interrupting arrangement of FIGS. 1 and 2.

Using triggered vacuum gaps for the surge suppressing circuits 99 and 399 imparts exceptional flexibility to our protective arrangement. In this respect, the conditions required for causing a spark-over can be rapidly changed in a precise manner by a simple adjustment of the trigger control circuit of each gap device. For example, under normal conditions, the gap device 100 will sparkover when a predetermined high voltage is present thereacross to provide for the above-described protection against lightning surges. But when the interrupter 25 is operated, means 74, 75a (schematically shown in FIG. 4) responsive to this interrupting operation quickly and automatically adjusts the trigger circuit of each gap device to depress its effective sparkover voltage and adapt it for limiting the voltage across the interrupter 25 to the desired level, as was described hereinabove. In the schematic showing of FIG. 4 a pulse source 101 is provided for delivering a pulse to the trigger gap 151 when the pulse source is turned on. This pulse source 101 is turned on by completing its turn-on circuit 112 by means of a high-speed switching device schematically shown as a thyraton 114. Switching device 114 is normally nonconductive but when a suitable signal is applied to its grid 115 it becomes conductive and turns on the pulse source. The turn-on signal is derived from a conventional voltage-responsive pulse circuit 117 that is connected across one capacitor 118 of a series of capacitors 118 and 119 connected across the gap device 100. Under normal conditions the voltage-responsive pulse circuit 117 turns on thyraton 114 when the voltage across capacitor 118 reaches a predetermined high value. But when the circuit interrupter 25 opens, the voltage-responsive circuit 117 is modified (as by switching in a resistor with operating means 75a) so that it will operate in response to a much lower voltage across capacitor 118. A similar circuit is shown in more detail in FIG. 3 of application S.N. 428,746—Lee et al. assigned to the assignee of the present invention.

What is claimed is:

1. Means for interrupting a direct-current circuit that comprises a D-C source having a pair of terminals, first and second conductors respectively connected to said terminals, and a load connected across said conductors, comprising:
   (a) a pair of separable contacts connected in a first one of said conductors in series with said load and located between a first terminal of said source and said load,
   (b) means for normally maintaining said contacts in engagement to enable load current to flow therethrough,
   (c) a normally-open commutating circuit connected across said contacts and comprising normally-open circuit-making means and a commutating capacitor connected in series-circuit relationship with each other,
   (d) said commutating capacitor being connected to said D-C circuit at the source side of said contacts even when said circuit-making means is opened,
   (e) means for causing said capacitor to be charged from said source when said circuit-making means is open, comprising resistance means connected between the juncture of said capacitor and said circuit-making means and the second one of said conductors,
   (f) means for separating said contacts to draw an arc therebetween,
   (g) means for forcing the current through said contacts to zero comprising means for closing said circuit-making means upon establishment of said arc to discharge said commutating capacitor through said arc,
   (h) means for limiting the recovery voltage appearing across said contacts when the current through said contacts is forced to zero comprising:
   (h') a surge suppressing circuit comprising the series combination of a normally-open gap device and a surge-absorbing resistor connected between the source side of said contacts and the conductor connected to said second terminal of said source, and
   (h") means for causing a spark-over of said gap device near the point at which the current through said contacts reaches zero, thereby causing current from said source to pass through said gap device and said surge-absorbing resistor,
   (i) and means for forcing the current through said gap device to zero comprising means for connecting said capacitor across said gap device to discharge said capacitor therethrough.

2. The interrupting means of claim 1 in which said gap device is caused to spark over immediately after the current through said contacts reaches zero and as said recovery voltage builds up.

3. The interrupting means of claim 1 in which said surge-absorbing resistor is a non-linear resistor that has negative resistance-current characteristics.

4. The interrupting means of claim 1 in which said gap device is a triggered vacuum gap and said surge-absorbing resistor is a non-linear resistor having negative resistance-current characteristics.

5. The interrupting means of claim 1 in which said means for connecting said capacitor across said gap device comprises a triggered gap device connected between the juncture of said capacitor and said circuit-making means and the juncture of said gap device and said surge-absorbing resistor.

6. The interrupting means of claim 1 in which said means for connecting said capacitor across said gap device comprises second circuit-making means connected between the juncture of said capacitor and said first circuit-making means and the juncture of said gap device and said surge-absorbing resistor.

7. The interrupting means of claim 1 in which said surge-absorbing resistor is a non-linear resistor that has negative resistance-current characteristics and has a sufficiently low resistance under high current conditions to limit the voltage appearing thereacross under the highest currents to less than 2.5 times the normal voltage appearing between said terminals.

8. The interrupting means of claim 1 in combination with a second surge suppressing circuit on the load side of said contacts connected between said two conductors, said second surge suppressing circuit comprising the series combination of a second gap device and a non-linear resistor, means for causing a sparkover of said second gap device during an interrupting operation immediately after the current through said contacts has been forced to zero, and means for limiting the voltage appearing across said second surge suppressing circuit from the instant of breakdown until current ceases flowing therethrough to a value less than the normal voltage appearing thereacross when said contacts are closed.

9. The interrupting means of claim 8 in which when said contacts are closed, the gap device in said first surge suppressing circuit is set to spark-over at a lower value of voltage between said conductors than the voltage between said conductors required to produce a spark-over of the gap device in said second suppressing circuit.

10. Means for interrupting a direct-current circuit that comprises a D-C source having a pair of terminals, first and second conductors respectively connected to said terminals, and a load connected across said conductors, comprising:
   (a) a pair of separable contacts connected in a first one of said conductors in series with said load and located between a first terminal of said source and said load,
   (b) means for normally maintaining said contacts in engagement to enable load current to flow therethrough,
   (c) a normally-open commutating circuit connected across said contacts and comprising normally-open circuit-making means and a commutating capacitor connected in series-circuit relationship with each other,
   (d) means for charging said commutating capacitor prior to an interrupting operation,
   (e) means for separating said contacts to draw an arc therebetween,
   (f) means for forcing the current through said contacts to zero comprising means for closing said circuit-making-means upon establishment of said arc to discharge said commutating capacitor through said arc.
   (g) means for limiting the recovery voltage appearing across said contacts when the current through said contacts is forced to zero comprising:
   (g') the series combination of a normally-open gap device and a surge-absorbing resistor connected between the source side of said contacts and the conductor connected to said second terminal of said source, and
   (g") means for causing a spark-over of said gap device near the point at which the current through said contacts reaches zero, thereby causing current from said source to pass through said gap device and said surge absorbing resistor, (h) and means for forcing the current through said gap device to zero comprising means for connecting said capacitor across said gap device to discharge said capacitor therethrough.

11. The interrupting means of claim 10 in which means for connecting said capacitor across said gap device comprises an additional resistor for limiting the discharge current from said capacitor through said gap device to a substantially lower value than the discharge current from said capacitor through said inter-contact arc.

12. The interrupting means of claim 10 in which said gap device is a triggered vacuum gap and said surge-absorbing resistor is a non-linear resistor having negative resistance-current characteristics.

13. Means for interrupting a direct-current circuit that comprises a D-C source having a pair of terminals, first and second conductors respectively connected to said terminals, and a load connected across said conductors, comprising:
 (a) an interrupting device connected in a first one of said conductors in series with said load and located between a first terminal of said source and said load,
 (b) means for normally maintaining said interrupting device in a conductive condition to enable load current to flow therethrough,
 (c) a normally-open commutating circuit connected across said interrupting device and comprising normally-open circuit-making means and a commutating capacitor connected in series-circuit relationship with each other.
 (d) means for charging said commutating capacitor prior to an interrupting operation,
 (e) means for forcing the current through said interrupting device to zero comprising means for closing said circuit-making means to discharge said commutating capacitor through said interrupting device,
 (f) means for limiting the recovery voltage appearing across said interrupting device when the current through said interrupting device is forced to zero comprising:
 (f′) a surge suppressing circuit comprising the series combination of a normally-non-conducting switching device and a surge-absorbing resistor connected between the source side of said interrupting device and the conductor connected to said second terminal of said source, and
 (f″) means for causing breakover of said switching device near the point at which the current through said interrupting device reaches zero, thereby causing current from said source to pass through said switching device and said surge-absorbing resistor,
 (g) and means for forcing the current through said switching device to zero comprising means for connecting said capacitor across said switching device to discharge said capacitor therethrough.

14. The interrupting means of claim 13 in which said means for connecting said capacitor across said switching device comprises an additional resistor for limiting the discharge current from said capacitor through said switching device to a substantially lower value than the discharge current from said capacitor through said interrupting device.

15. The interrupting means of claim 13 in which said switching device is a triggered vacuum gap and said surge-absorbing resistor is a non-linear resistor having negative resistance-current characteristics.

16. The interrupting means of claim 13 in combination with a second surge suppressing circuit on the load side of said contacts connected between said two conductors, said second surge suppressing circuit comprising the series combination of a second normally non-conducting switching device and a non-linear resistor, means for causing a breakover of said second switching device during an interrupting operation immediately after the current through said interrupting device has been forced to zero, and means for limiting the voltage appearing across said second surge suppressing circuit from the instant of breakdown until current ceases flowing therethrough to a value less than the normal voltage appearing thereacross when said interrupting device is conducting.

17. The interrupting means of claim 16 in which when said interrupting device is in a conductive condition, the switching device in said first surge suppressing circuit is set to breakover at a lower value of voltage between said conductors than the voltage between said conductors required to produce breakover of the switching device in said second suppressing circuit.

References Cited
UNITED STATES PATENTS

| | | | |
|---|---|---|---|
| 3,252,050 | 5/1966 | Lee | 317—11 |
| 3,390,305 | 6/1968 | Greenwood | 317—11 |

LEE T. HIX, Primary Examiner

J. D. TRAMMELL, Assistant Examiner

U.S. Cl. X.R.

307—136; 317—41, 68